US010200601B2

(12) United States Patent
Mukunashi

(10) Patent No.: US 10,200,601 B2
(45) Date of Patent: Feb. 5, 2019

(54) IMAGE STABILIZATION APPARATUS THAT ENABLES HIGHLY ACCURATE IMAGE STABILIZATION WHEN PANNING SHOT CAPTURING IS PERFORMED, METHOD FOR CONTROLLING THE SAME, AND STORAGE MEDIUM

(71) Applicant: CANON KABUSHIKI KAISHA, Tokyo (JP)

(72) Inventor: Masayuki Mukunashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 15/334,463

(22) Filed: Oct. 26, 2016

(65) Prior Publication Data

US 2017/0134657 A1    May 11, 2017

(30) Foreign Application Priority Data

Nov. 11, 2015 (JP) ................................ 2015-221395

(51) Int. Cl.
| | |
|---|---|
| H04N 5/228 | (2006.01) |
| H04N 5/232 | (2006.01) |
| G02B 27/64 | (2006.01) |
| H04N 5/235 | (2006.01) |

(52) U.S. Cl.
CPC ....... *H04N 5/23222* (2013.01); *G02B 27/646* (2013.01); *H04N 5/23258* (2013.01); *H04N 5/23261* (2013.01); *H04N 5/23287* (2013.01); *H04N 5/2353* (2013.01)

(58) Field of Classification Search
CPC ........... H04N 5/23254; H04N 5/23258; H04N 5/23261; H04N 5/23287; H04N 5/2353
See application file for complete search history.

(56) References Cited

U.S. PATENT DOCUMENTS

| | | | | |
|---|---|---|---|---|
| 8,031,229 | B2 * | 10/2011 | Mori | G03B 5/02 |
| | | | | 348/208.1 |
| 9,635,265 | B2 * | 4/2017 | Mukunashi | G02B 27/646 |
| 9,692,973 | B2 * | 6/2017 | Haruna | H04N 5/23254 |
| 9,762,800 | B2 * | 9/2017 | Tsubaki | H04N 5/23287 |
| 2001/0022619 | A1 * | 9/2001 | Nishiwaki | H04N 5/23248 |
| | | | | 348/208.99 |

(Continued)

FOREIGN PATENT DOCUMENTS

JP        04-163535 A    6/1992

*Primary Examiner* — Sinh Tran
*Assistant Examiner* — Selam T Gebriel
(74) *Attorney, Agent, or Firm* — Cowan, Liebowitz & Latman, P.C.

(57) ABSTRACT

An image stabilization apparatus includes: a first detection unit that detects object moving amounts at a plurality of positions on a screen; a determination unit that determines an object range on the screen based on a result of detection performed by the first detection unit; a holding unit that holds object position information regarding an object position within the object range in association with moving amount information at the object position based on the result of detection performed by the first detection unit and a result of detection performed by a second detection unit that detects a motion of the apparatus; and a control unit that controls an operation of an image stabilization unit that corrects object image blur at the object position held in the holding unit.

10 Claims, 14 Drawing Sheets

(56) References Cited

U.S. PATENT DOCUMENTS

| | | | |
|---|---|---|---|
| 2005/0168581 A1* | 8/2005 | Shinohara | H04N 5/23203 348/208.1 |
| 2007/0110418 A1* | 5/2007 | Imada | G03B 5/04 396/55 |
| 2010/0158493 A1* | 6/2010 | Miyasako | H04N 5/23212 396/55 |
| 2013/0222619 A1* | 8/2013 | Lin | H04N 5/23254 348/208.1 |
| 2015/0085138 A1* | 3/2015 | Sugaya | H04N 5/23219 348/169 |
| 2015/0179219 A1* | 6/2015 | Gao | G06K 9/00664 386/278 |

\* cited by examiner

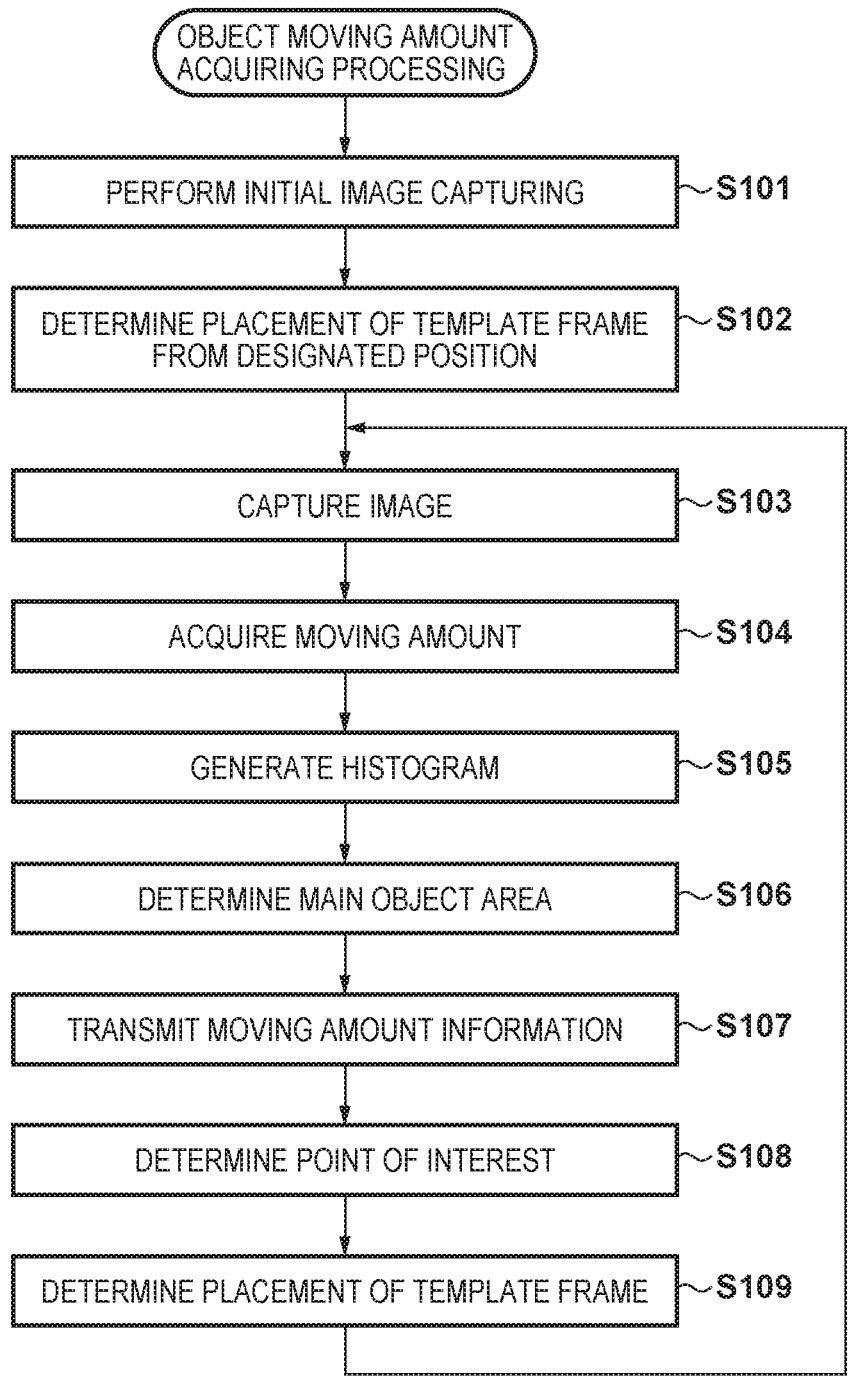

| INDEX | COORDI-NATES | ANGULAR VELOCITY | | | | |
|---|---|---|---|---|---|---|
| | | 1 | 2 | 3 | 4 | 5 |
| 1 | X01,Y01 | ω011 | ω012 | ω013 | ω014 | ω015 |
| 2 | BLANK | — | — | — | — | — |
| 3 | X03,Y03 | ω021 | ω022 | ω023 | ω024 | ω025 |
| ⋮ | ⋮ | ⋮ | ⋮ | ⋮ | ⋮ | ⋮ |
| 35 | X35,Y35 | ω351 | ω352 | ω353 | ω354 | ω355 |

FIG. 14

| INDEX | ANGULAR VELOCITY AND COORDINATES | | | | |
|---|---|---|---|---|---|
| | 1 | 2 | 3 | ... | 15 |
| 1 | ω0101 | ω0102 | ω0103 | ... | ω0115 |
| | X0101,Y0101 | X0102,Y0102 | X0103,Y0103 | ... | X0115,Y0115 |
| 2 | — | — | — | ... | — |
| 3 | ω0301 | ω0302 | ω0303 | ... | ω0315 |
| | X0301,Y0301 | X0302,Y0302 | X0303,Y0303 | ... | X0315,Y0315 |
| 4 | ω0401 | ω0402 | ω0403 | ... | ω0415 |
| | X0401,Y0401 | X0402,Y0402 | X0403,Y0403 | ... | X0415,Y0415 |
| ... | ... | ... | ... | ... | ... |
| 35 | ω3501 | ω3502 | ω3503 | ... | ω3515 |
| | X3501,Y3501 | X3502,Y3502 | X3503,Y3503 | ... | X3515,Y3515 |

IMAGE STABILIZATION APPARATUS THAT ENABLES HIGHLY ACCURATE IMAGE STABILIZATION WHEN PANNING SHOT CAPTURING IS PERFORMED, METHOD FOR CONTROLLING THE SAME, AND STORAGE MEDIUM

BACKGROUND OF THE INVENTION

Field of the Invention

The present invention relates to an image blur correction technique of an image capturing apparatus for correcting an image blur generated at the time of capturing a panning shot.

Description of the Related Art

Conventionally, a technique called panning shot capturing is known as a photography technique that represents a sense of speed of a moving object. This photography technique is intended to obtain images in which the moving object remains stationary while the background is blurred by a photographer panning the camera along with the motion of the object. At the time of panning shot capturing, the photographer needs to pan the camera along with the motion of the object. However, it is often the case that if the panning speed is too high or too low, a difference occurs between the moving speed of the object and the panning speed, resulting in images in which the object is blurred.

To address this, Japanese Patent Laid-Open No. 4-163535 proposes a method for correcting an object blur by moving an image capturing unit or part of an optical system of a lens during exposure based on "the relative object angular velocity with respect to the image capturing apparatus calculated before exposure" and "the angular velocity of the image capturing apparatus during exposure obtained from an angular velocity sensor". The relative object angular velocity with respect to the image capturing apparatus is calculated from "the amount of movement of the object on the image plane detected from temporally consecutive images" and an output of "the angular velocity sensor".

However, with the conventional technique disclosed in Japanese Patent Laid-Open No. 4-463535 mentioned above, in the case of a relativity large object, blur may be corrected at a position other than the position intended by the photographer. FIG. 17 is a schematic view of a train moving from the right toward the left as viewed from the photographer, and it is known that the angular velocity varies at three points (A, B and C) as viewed from the photographer. FIG. 18 is a graph plotted based on the results obtained by sampling the angular velocity at the three points shown in FIG. 17 for a predetermined period of time. The horizontal axis indicates time, the time increasing from the left to the right. The vertical axis indicates angular velocity, the angular velocity increasing upward from the bottom. As can be seen from FIG. 18, the object angular velocity varies depending on which portion of the object is used to calculate the angular velocity at a given time.

SUMMARY OF THE INVENTION

The present invention has been made in view of the problems described above, and provides an image stabilization apparatus that enables highly accurate image stabilization when panning shot capturing is performed.

According to a first aspect of the present invention, there is provided an image stabilization apparatus comprising: a first detection unit that detects object moving amounts at a plurality of positions on a screen by using two consecutive images captured by an image capturing unit; a determination unit that determines an object range on the screen based on a result of detection performed by the first detection unit; a holding unit that holds object position information regarding an object position within the object range in association with moving amount information at the object position based on the result of detection performed by the first detection unit and a result of detection performed by a second detection unit that detects a motion of the apparatus; and a control unit that controls an operation of an image stabilization unit that corrects object image blur so as to correct an object image blur at the object position based on the object position information and the moving amount information at the object position held in the holding unit.

According to a second aspect of the present invention, there is provided a method for controlling an image stabilization apparatus, the method comprising: detecting, by a first detection unit, object moving amounts at a plurality of positions on a screen by using two consecutive images captured by an image capturing unit; determining an object range on the screen based on a result of detection performed in the detecting; holding object position information regarding an object position within the object range in association with moving amount information at the object position based on the result of detection performed by the first detection unit and a result of detection performed by a second detection unit that detects a motion of the apparatus; and controlling an operation of an image stabilization unit that corrects object image blur so as to correct an object image blur at the object position based on the object position information and the moving amount information at the object position held in the holding.

Further features of the present invention will become apparent from the following description of exemplary embodiments (with reference to the attached drawings).

BRIEF DESCRIPTION OF THE DRAWINGS

FIG. 7 is a flowchart illustrating an operation performed by a moving amount detection unit.

FIG. 14 is a diagram showing an example of angular velocity data for each object position according to a second embodiment.

DESCRIPTION OF THE EMBODIMENTS

Hereinafter, embodiments of the present invention will be described in detail with reference to the accompanying drawings.

First Embodiment

Figure 1:
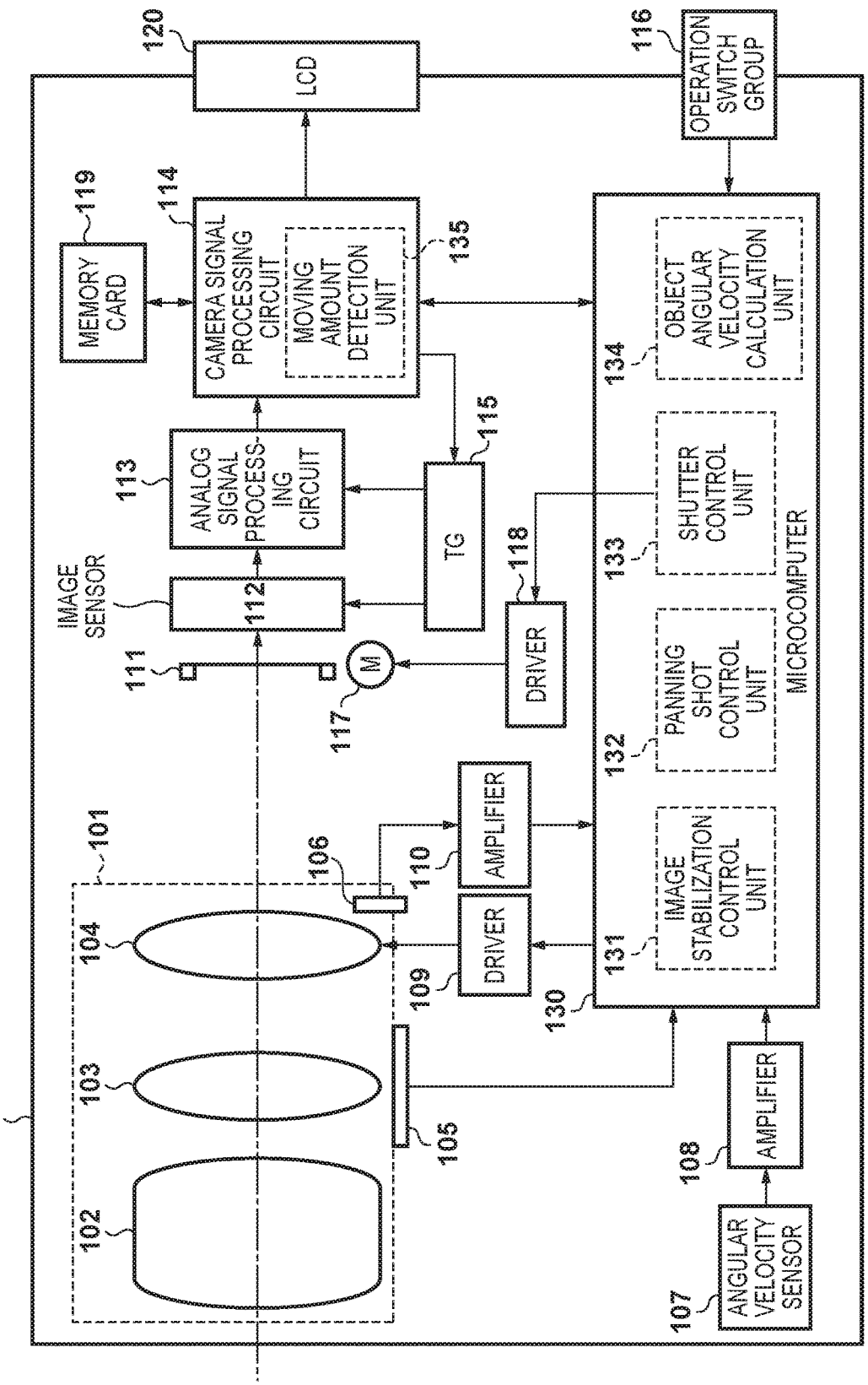
FIG. 1 is a block diagram showing a configuration of a camera that is an image capturing apparatus according to a first embodiment in which an image stabilization apparatus according to the present invention is mounted.

FIG. 1 is a block diagram showing a configuration of a camera that is an image capturing apparatus according to a first embodiment in which an image stabilization apparatus according to the present invention is mounted. In FIG. 1, in a camera 100, a lens is integrated in the body of the camera. However, the present invention is not limited to a camera in which a lens and the body of the camera are integrally configured, and is also applicable to a single-lens reflex camera configured such that a lens is detachably attached to the body of the camera.

The camera 100 includes a capturing lens unit 101 including a main capturing optical system 102, a zoom lens group 103 capable of changing the focal distance, and a shift lens group 104 that optically corrects an image blur with respect to the optical axis caused by camera vibration by moving in a direction perpendicular to the optical axis. The capturing lens unit 101 forms an object image on an image sensor 112, which will be described later. Also, the capturing lens unit 101 includes a zoom encoder 105 that detects the position of the zoom lens group 103, a position sensor 106 that detects the position of the shift lens group 104, and an angular velocity sensor 107 that detects camera vibration. The capturing lens unit 101 further includes an amplifier 108 that amplifies an output of the angular velocity sensor 107, a camera controlling microcomputer (hereinafter referred to as microcomputer) 130, a driver 109 that drives the shift lens group 104, and an amplifier 110 that amplifies an output of the position sensor 106 of the shift lens group 104.

Figure 8A:
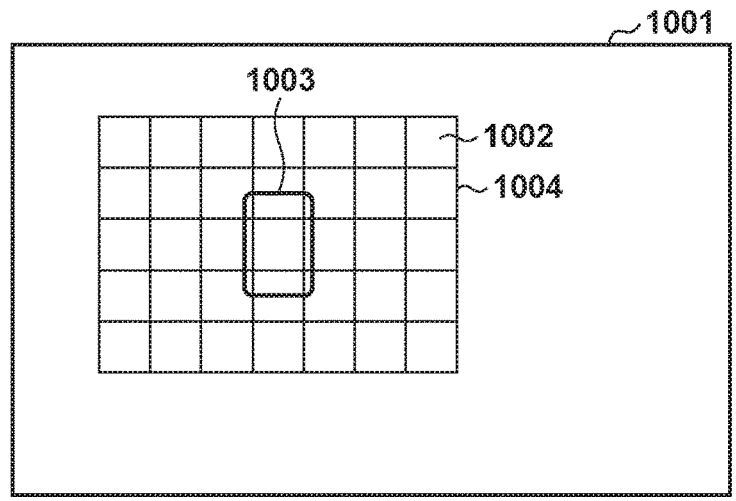
FIGS. 8A and 8B are diagrams showing how a template frame is arranged.
Figure 8B:
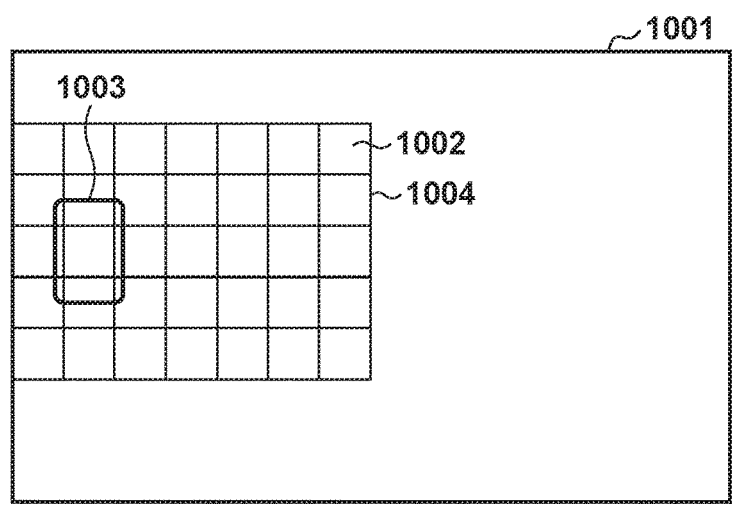

The camera 100 also includes a shutter 111, an image sensor 112 such as a CMOS sensor, an analog signal processing circuit 113, a camera signal processing circuit 114, and a timing generator 115 that sets the operation timings of the image sensor 112 and the analog signal processing circuit 113. The camera 100 further includes a power switch, a release switch, a camera operation switch group 116 composed of a selection switch for selecting a panning shot assistance mode or the like, a shutter driving motor 117, and a driver 118 that drives the shutter driving motor 117. The camera 100 still further includes a memory card 119 that records captured images, and a liquid crystal display (hereinafter referred to as LCD) 120 that monitors images to be captured by the camera and displays captured images. The LCD 120 can display a live view by consecutively displaying captured images. Also, a frame (hereinafter referred to as an "image stabilization frame") is displayed by being superimposed on the screen on which a live view is displayed, and the photographer (user) can move the image stabilization frame so as to provide, to the camera, an indication of a position at which image blur is suppressed. Also, the position of the image stabilization frame can be changed to any position by the photographer. An image stabilization frame 1003 is shown in FIGS. 8A and 8B.

The camera signal processing circuit 114 includes a moving amount detection unit 135. The microcomputer 130 includes an image stabilization control unit 131 that performs image stabilization control, a panning shot control unit 132 that performs panning shot assistance control, a shutter control unit 133 that controls the shutter, and an object angular velocity calculation unit 134 that calculates an object angular velocity. The microcomputer 130 performs other control operations such as a focus lens control operation, an aperture control operation and the like, but for the sake of ease of description, the units that perform other control operations are omitted in FIG. 1. Also, in order to implement image stabilization, blur detection and correction are performed with respect to two perpendicular axes such as, for example, the horizontal direction and the vertical direction, but the configuration is completely the same for the two axes, and thus the configuration for only one axis is described here. In FIG. 1, when the camera is powered on by the operation switch group 116, the microcomputer 130 detects a change of the state of the camera, and power supply to the circuits provided in the camera 100 and initialization are performed.

In a normal mode in which the panning shot assistance mode is not set, the angular velocity sensor 107 detects camera vibration in the camera 100 caused by hand vibration, the image stabilization control unit 131 drives the shift lens group 104 by using the result of detection, and an image stabilization operation is thereby performed.

Figure 2:
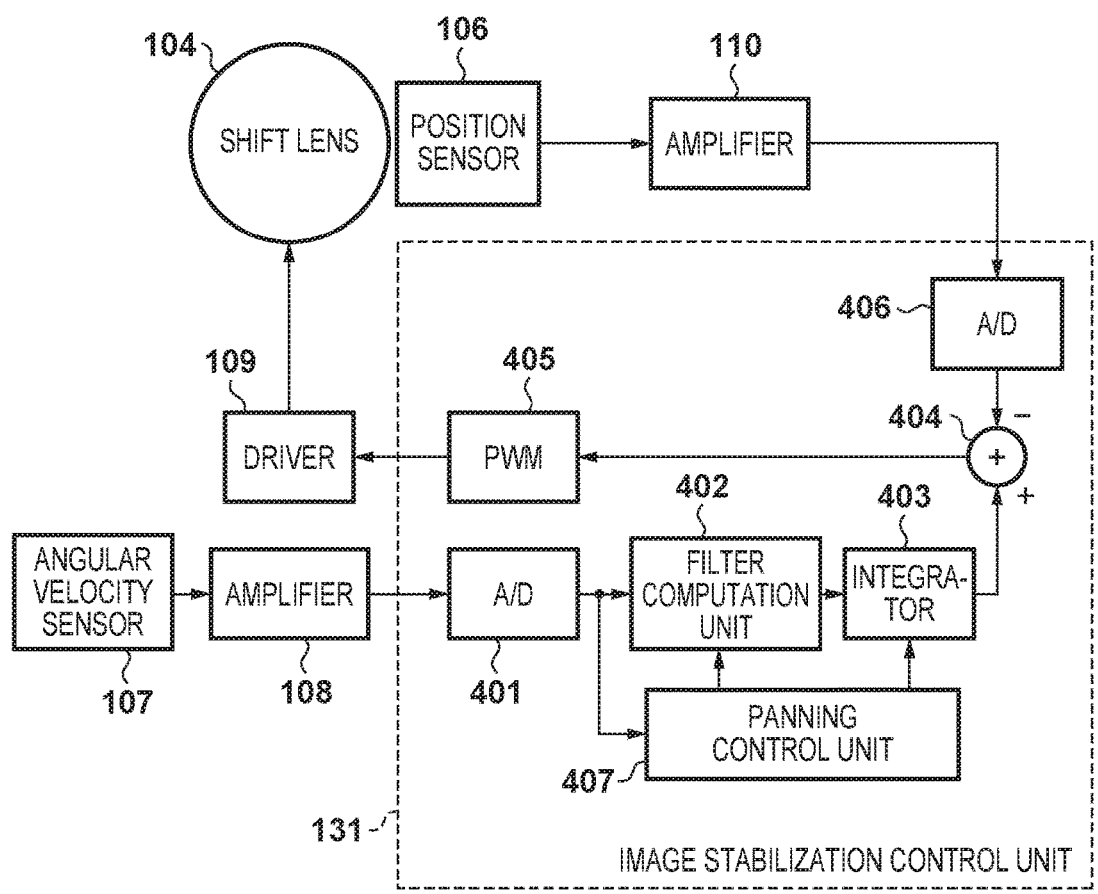
FIG. 2 is a block diagram showing a configuration of the image stabilization apparatus.

The image stabilization function will now be described. FIG. 2 is a block diagram showing a configuration of the image stabilization apparatus, and the constituent elements that are the same as those of FIG. 1 are given the same reference numerals, and a description thereof will be omitted. In FIG. 2, the image stabilization control unit 131 includes an A/D converter 401, a filter computation unit 402, an integrator 403, an adder 404, a PWM output unit 405, an A/D converter 406, and a panning control unit 407. The A/D converter 401 converts a camera vibration signal detected by the angular velocity sensor 107 into a digital signal. The output data of the angular velocity sensor 107 is sampled at a frequency of about 1 to 10 kHz. The filter computation unit 402 constituted by a high-pass filter (HPF) or the like takes measures for panning by removing an offset component included in the output of the angular velocity sensor 107 and changing the cutoff frequency. The integrator 403 converts the angular velocity data into angular displacement data so as to generate drive target data for the shift lens. The A/D converter 406 converts the output of the position sensor 106 that detects the position of the shift lens group 104 into digital data. The adder 404 calculates data regarding the actual driving amount of the shift lens group 104 by subtracting the current position of the shift lens from the drive target value of the shift lens group 104. The PWM output unit 405 outputs the calculated driving amount data to the shift lens driving driver 109. The panning control unit 407 determines whether or not the camera 100 is being panned from the state of the angular velocity data. If it is determined that the camera 100 is being panned, control for changing the cutoff frequency of the filter computation unit 402 and adjustment of the output of the integrator 403 are performed.

Figure 3:
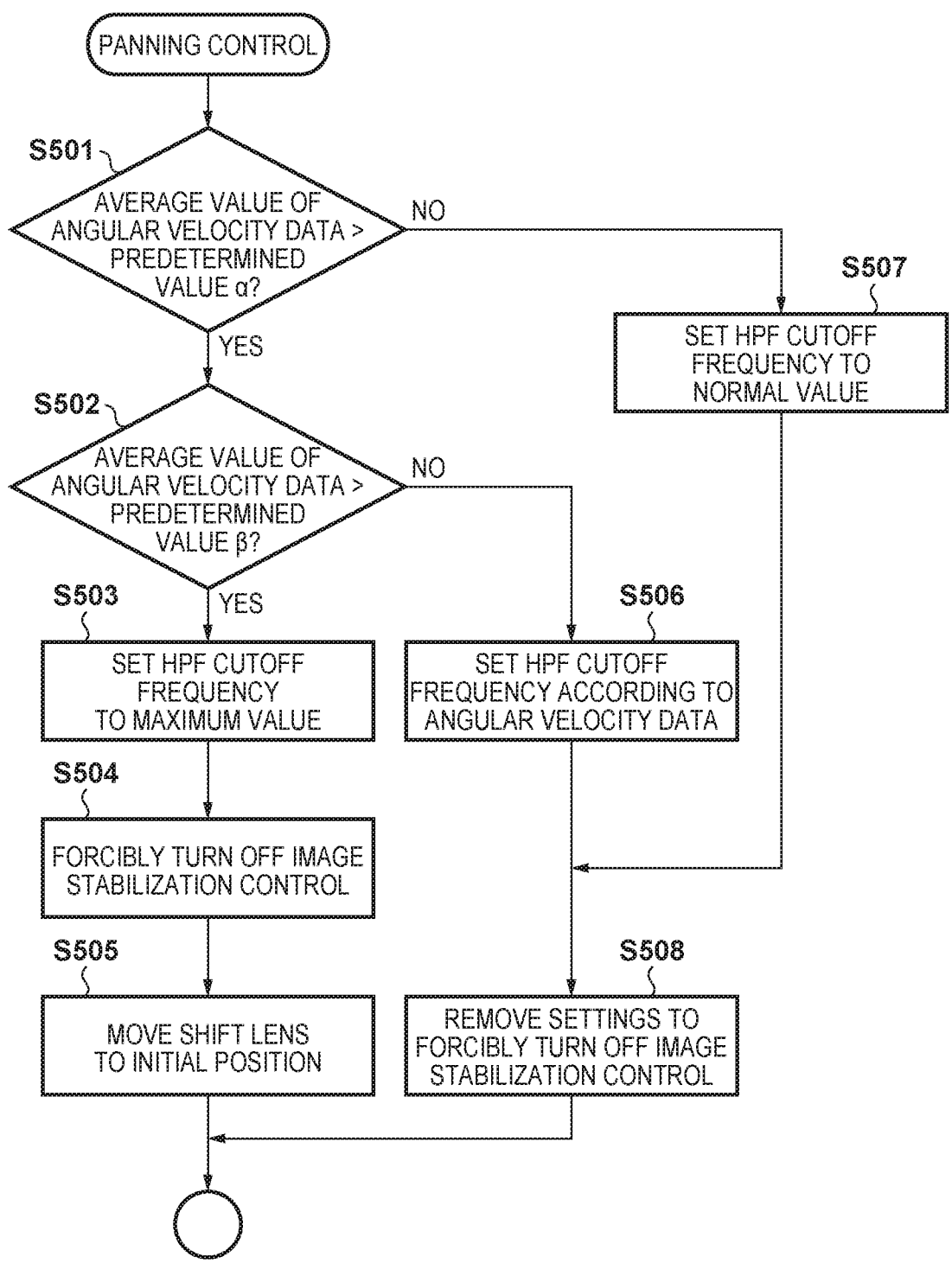
FIG. 3 is a flowchart illustrating an example of a panning control operation.

FIG. 3 is a flowchart illustrating an example of a panning control operation performed by the image stabilization control unit 131 provided in the microcomputer 130. Hereinafter, panning control will be described with reference to FIG. 3.

In FIG. 3, in S501, it is determined whether or not the average value of the angular velocity data converted to digital values by the A/D converter 401 (the average value of a predetermined number of times sampling was performed) is greater than a predetermined value $\alpha$. If it is determined that the average value is less than or equal to the predetermined value $\alpha$, it is determined that the camera is not being panned. If it is determined that the average value is greater than the predetermined value $\alpha$, in S502, it is determined whether or not the average value is greater than a predetermined value $\beta$. Then, if it is determined that the average value is less than or equal to the predetermined value $\beta$, it is determined that the camera is being slowly panned. If it is determined that the average value is greater than the predetermined value $\beta$, it is determined that the camera is being swiftly panned. In S503, the cutoff frequency of the HPF provided in the filter computation unit 402 is set to a maximum value, and in S504, image stabilization control is forcibly turned off. This operation is performed to eliminate a sense of discomfort when the image stabilization control is turned off by increasing the cutoff frequency of the HPF to gradually stop the shift lens. Also, when the camera is swiftly panned, the amount of movement caused by panning becomes significantly greater than the amount of hand vibration, and even though hand vibration remains as a result of the image stabilization being turned off, there is no sense of discomfort. If correction is attempted by taking the swift panning as a large vibration without making this setting, image blur stops at the time of the start of panning, but when the shift lens group 104 thereafter reaches a correction edge, the image suddenly moves significantly, which is perceived as a very unnatural motion.

After that, in S505, the output of the integrator 403 is changed gradually from the current data to the initial position data so as to move the shift lens group 104 to the initial position. This operation is performed because it is desirable that the shift lens group 104 is at the initial position in the driving range when the image stabilization operation is resumed next time.

If, on the other hand, it is determined in S502 that the average value of the angular velocity data is less than or equal to the predetermined value $\beta$ (if it is determined that the camera is being slowly panned), the procedure advances to S506, where the cutoff frequency of the HPF is set according to the magnitude of the angular velocity data. This is because when the camera is being slowly panned, it is not possible to completely ignore the influence of hand vibration, and the operation is performed to correct the hand vibration while maintaining the followability of the image at the time of panning such that an unnatural motion does not occur.

Also, if it is determined in S501 that the average value of the angular velocity data is less than or equal to the predetermined value $\alpha$ (if it is determined that the camera is not being panned), in S507, the cutoff frequency of the HPF is set to a normal value. If it is determined that the camera is not being swiftly panned, in S508, the settings to forcibly turn off the image stabilization control is removed.

Figure 4:
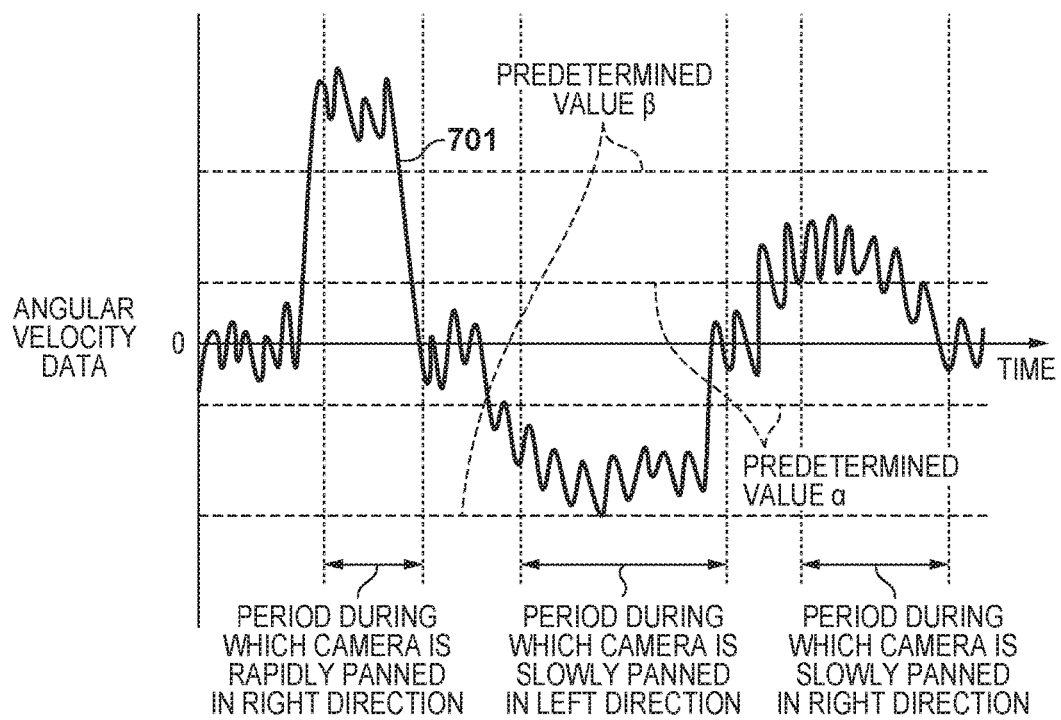
FIG. 4 is a diagram showing a relationship between angular velocity data in the horizontal direction and predetermined values $\alpha$ and $\beta$ when the camera is being panned.

FIG. 4 is a diagram showing a relationship between angular velocity data in the horizontal direction and the predetermined values $\alpha$ and $\beta$ when the camera is being panned, with angular velocity data 701 being used as an example of the angular velocity data. In this example, when the camera is panned in the right direction, an output indicating a plus (+) sign is output, and when the camera is panned in the left direction, an output indicating a minus (−) sign is output. In the example shown in FIG. 4, rapid panning in the right direction and slow panning in the right and left directions are detected. As can be seen from FIG. 4, the angular velocity data takes a value significantly different from the initial value (0 in this example) while the camera is being panned. Accordingly, when the data is integrated to calculate the target drive value of the shift lens, due to DC offset component, the integrator 403 outputs a very large value, resulting in an uncontrollable state. Accordingly, when panning is detected, it is necessary to remove the DC component by changing the cutoff frequency of the HPF to a high value. In the case of rapid panning, because it is particularly noticeable, the cutoff frequency is increased to an even higher value, so as to not increase the output of the integrator 403. In the case where the panning speed is high, the motion of the image by the panning speed increases significantly with respect to hand vibration, and thus a sense of discomfort is not caused even when the image stabilization function is turned off with respect to the panning direction. As a result of the panning control being performed as described above, it is possible to monitor an image that does not cause a sense of discomfort on the display of live view image while the camera is being panned.

Next, the panning shot assistance mode will be described. In FIG. 1, when the panning shot assistance mode is set by the operation switch group 116, the moving amount detection unit 135 included in the camera signal processing circuit 114 detects an object moving amount from consecutive captured frame images and outputs the object moving amount. Then, the microcomputer 130 receives the moving amount and the angular velocity data detected by the angular velocity sensor 107.

Here, the angular velocity data corresponds to the panning shot speed of the camera 100, and thus by calculating the difference between the angular velocity data and the angular velocity calculated from the amount of movement of the main object on the image plane and the current focal distance of the lens, the angular velocity of the main object with respect to the camera is obtained. The object angular velocity calculation unit 134 calculates the angular velocity of the main object for each frame at the timing of processing the live view image to be monitored. Also, the object angular velocity calculation unit 134 transmits a number of combined information corresponding to several past frames to the panning shot control unit 132, the combined information being information in which the calculated object angular velocity and the time an image was generated at the time of calculation are combined.

Figure 5:
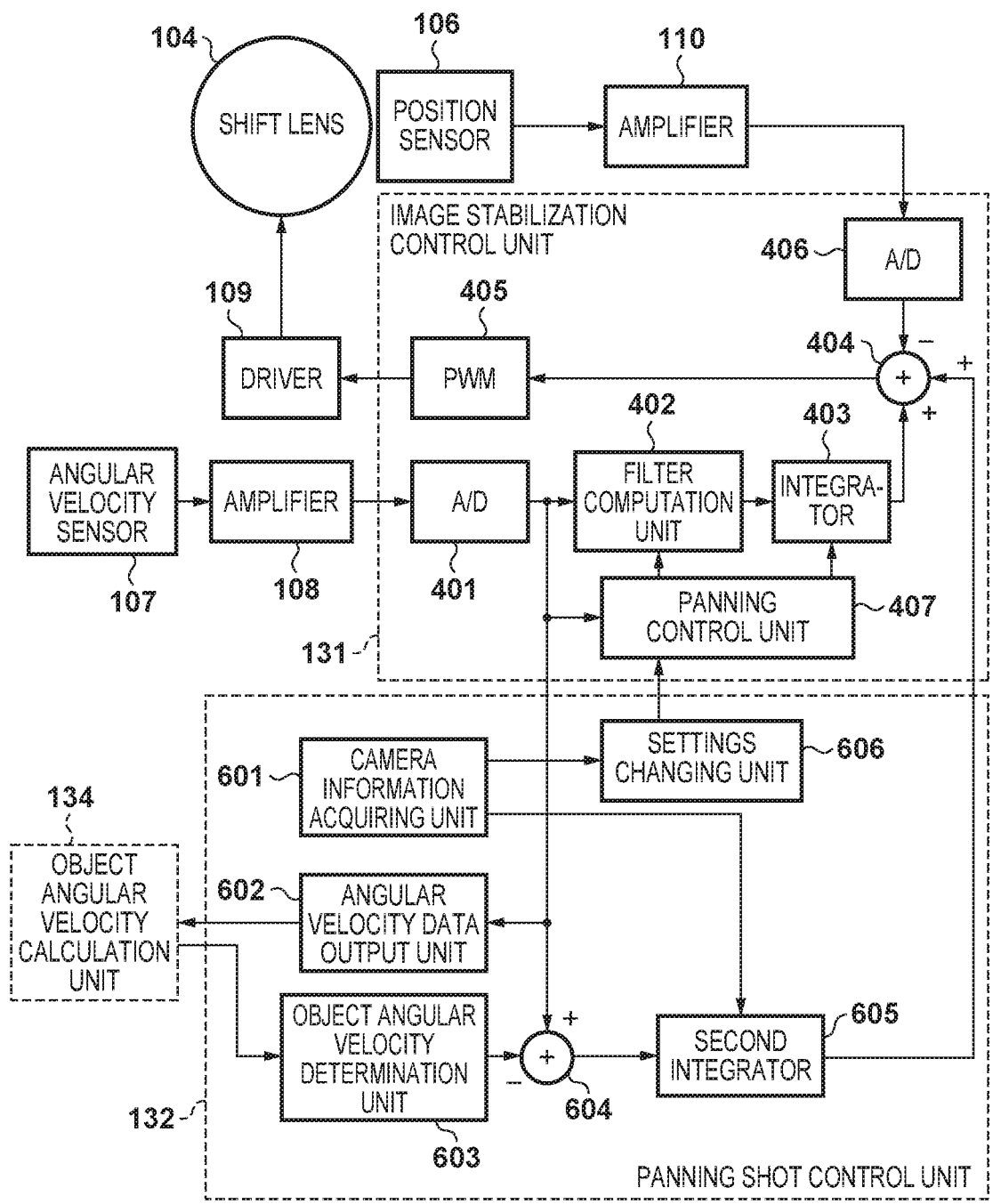
FIG. 5 is a block diagram showing a configuration of the image stabilization apparatus when it is in a panning shot assistance mode.

FIG. 5 is a block diagram showing a configuration of the image stabilization apparatus when it is in the panning shot assistance mode, and the constituent elements that are the same as those of FIGS. 1 and 2 are given the same reference numerals. In FIG. 5, the panning shot control unit 132 includes a camera information acquiring unit 601, an angular velocity data output unit 602, an object angular velocity determination unit 603, an adder 604, a second integrator 605, and a settings changing unit 606. The camera information acquiring unit 601 acquires, in particular, settings information regarding the panning shot assistance mode and release information. The angular velocity data output unit 602 samples the angular velocity data of the camera at a predetermined timing, and outputs the result to the object angular velocity calculation unit 134. The object angular velocity determination unit 603 determines the object angular velocity during exposure based on the current time and the number of combined information corresponding to several past frames calculated by the object angular velocity calculation unit 134, the combined information being information in which the object angular velocity and the time an image was generated at the time of calculation are combined. The adder 604 calculates the difference between the angular velocity of the angular velocity sensor and the object angular velocity. The second integrator 605 performs an integration operation only for a predetermined period of time. The settings changing unit 606 changes the settings according to the mode information acquired by the camera information acquiring unit 601.

When the panning shot assistance mode has been set through an operation of the operation switch group 116, the information is read by the camera information acquiring unit 601, and is notified to the settings changing unit 606. The settings changing unit 606 changes the settings of the panning control unit 407 according to the notified mode information. The settings change performed here is a change for facilitating transition to a rapid panning state. To be specific, the predetermined values β and α used in panning determination described above are changed. Also, the adder 604 calculates the difference between the angular velocity detected by the angular velocity sensor and the angular velocity of the main object, and transmits the result to the second integrator 605. The second integrator 605 starts an integration operation in response to a signal indicating an exposure period acquired by the camera information acquiring unit 601, and outputs a value that causes the shift lens to be positioned at the center during other periods. Here, when the shift lens is caused to be positioned at the center during periods other than the exposure period, the shift lens needs to be steeply moved from the current shift lens position to the center position at the end of the exposure period. However, an image signal is read from the image sensor 112 immediately after the end of the exposure period, and thus the image disappears on the LCD. Accordingly, the image motion caused by the steep movement of the shift lens does not pose a problem. Also, the output of the second integrator 605 is added together with the output of the integrator 403 and the position information of the shift lens group 104 by the adder 404, and the driving amount of the shift lens group 104 is calculated.

If a panning shot operation is actually performed by the photographer when the panning shot assistance mode has been set, the panning control unit 407 immediately performs panning control for the rapid panning state. As a result, the vibration correction operation is prohibited, and the shift lens group 104 corrects an amount corresponding to the difference between the angular velocity of panning of the camera and the object angular velocity. For this reason, the difference between the panning speed of the camera during exposure period and the speed of the object, which may cause an unsuccessful panning shot, is cancelled out by the operation of the shift lens, as a result of which a panning shot is successfully captured (assisted).

Figure 6:
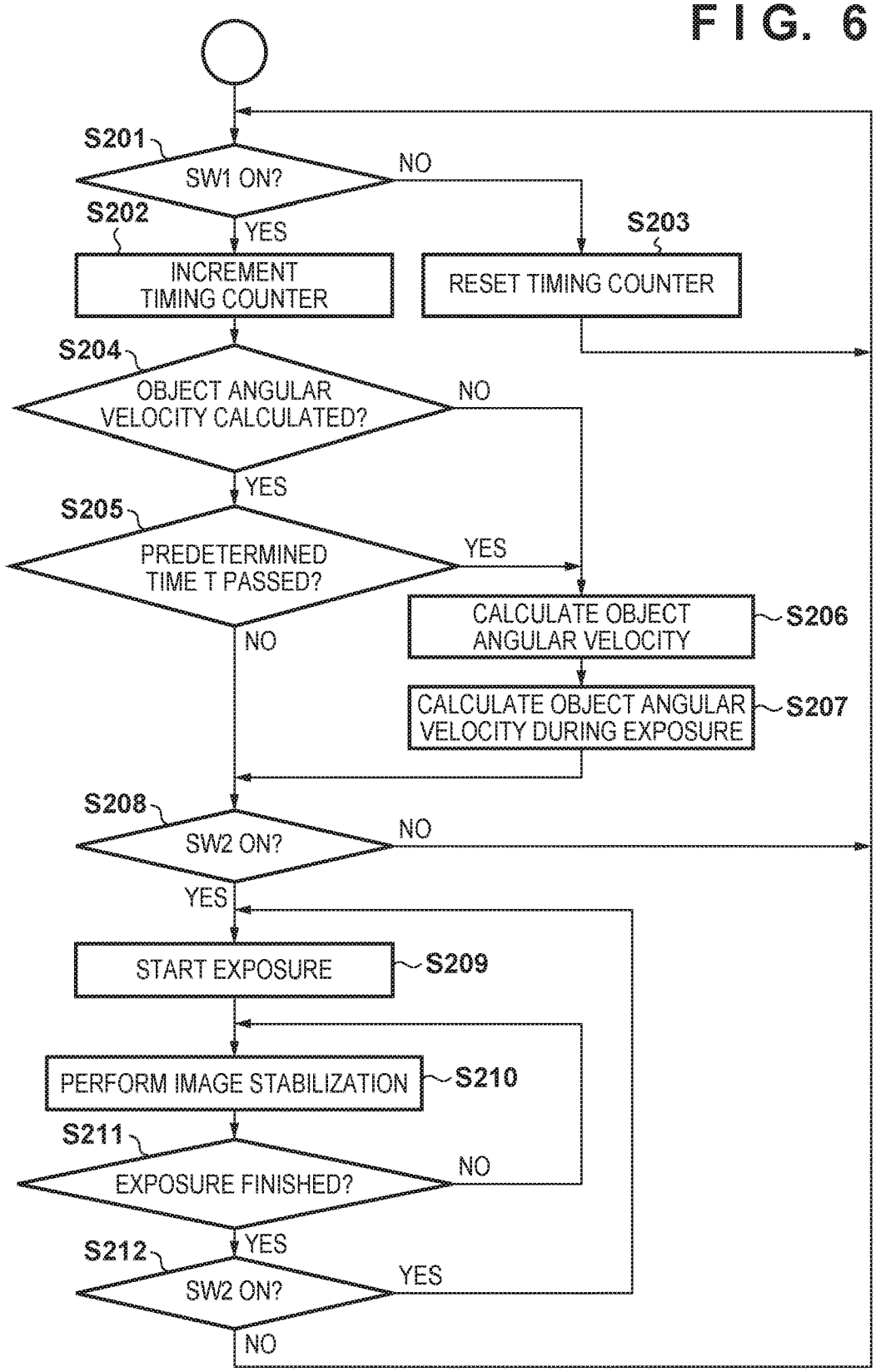
FIG. 6 is a flowchart illustrating a capturing operation in the panning shot assistance mode.

FIG. 6 is a flowchart illustrating a capturing operation in the panning shot assistance mode. In FIG. 6, in S201, it is detected whether or not the release switch has been pressed halfway down (a switch SW1 has been turned on). If it is detected that the switch SW1 has been turned on, the procedure advances to S202, where a timing counter is incremented. If it is determined that the switch SW1 has not been turned on, in S203, the timing counter is reset.

In S204, it is checked whether or not the angular velocity of the main object has already been calculated. If it is determined that the angular velocity of the main object has already been calculated, in S205, it is further checked whether or not the timing counter has reached a predetermined time T. If the angular velocity of the main object has not been calculated or if a predetermined period of time has passed although the angular velocity of the main object has been calculated, in S206, the angular velocity of the main object is calculated. Recalculation of the angular velocity of the main object is an action taking into consideration changes in the speed of the main object along with time. Each time the angular velocity of the main object is calculated, a notification is sent to the object angular velocity determination unit 603 included in the panning shot control unit 132.

In S207, an angular acceleration is calculated from the object angular velocities of several past frames acquired from the object angular velocity calculation unit 134, and an object angular velocity during exposure is calculated and determined by the object angular velocity determination unit 603 by taking into consideration a time lag between turning off of the release and the start of exposure. In S208, it is detected whether or not the release switch has been fully pressed (a switch SW2 has been turned on). If it is determined that the switch SW2 has not been turned on, the procedure returns to S201. If it is determined in S208 that the switch SW2 has been turned on, in S209, the shutter control unit 133 performs shutter control to start exposure.

In S210, the panning shot control unit 132 and the image stabilization control unit 131 work together to move the shift lens group 104 so as to perform image stabilization on the object image. In S211, it is determined whether or not exposure has been finished. If it is determined that exposure has been finished, the procedure advances to S212. If it is determined that exposure has not been finished, the procedure advances to S210. In S212, it is determined whether the switch SW2 has been turned on. If it is determined that the switch SW2 has been turned on, the procedure returns to S209, where the next image capturing starts. If it is determined that the switch SW2 has not been turned on, the procedure returns to S201.

FIG. 7 is a flowchart illustrating an operation performed by the moving amount detection unit 135. In S101, initial image capturing is performed to acquire a comparison source image, and the procedure advances to S102. In S102, a frame (template frame) in which a plurality of frames for acquiring the object moving amount (moving amount acquiring frames) are arranged is placed on the screen before next image capturing, and the procedure advances to S103. With the template frame, it is possible to designate a plurality of positions for acquiring the moving amount. In S102, the template frame is placed such that the image stabilization frame 1003 described above is positioned at the center. FIG. 8A shows an example of an angle of view 1001, moving amount acquiring frames 1002, a template frame 1004 and an image stabilization frame 1003. The template frame 1004 is a large frame in which seven moving amount acquiring frames 1002 are arranged in the horizontal direction and five moving amount acquiring frames 1002 are arranged in the vertical direction (7×5). The moving amount acquiring frames 1002 and the template frame are not displayed while a live view is displayed. If the image stabilization frame 1003 is set at an end of the angle of view 1001, as shown in FIG. 8B, the template frame 1004 is placed with an end thereof being aligned with the end of the angle of view 1001.

In S103, a plurality of moving amounts are detected according to the placement of the template frame 1004 while capturing images to provide a live view, and the procedure advances to S104. In S104, the results of the moving amount detection is obtained, and the procedure advances to S105. In S105, a histogram is generated from the acquired moving amounts, and the procedure advances to S106.

Figure 9:
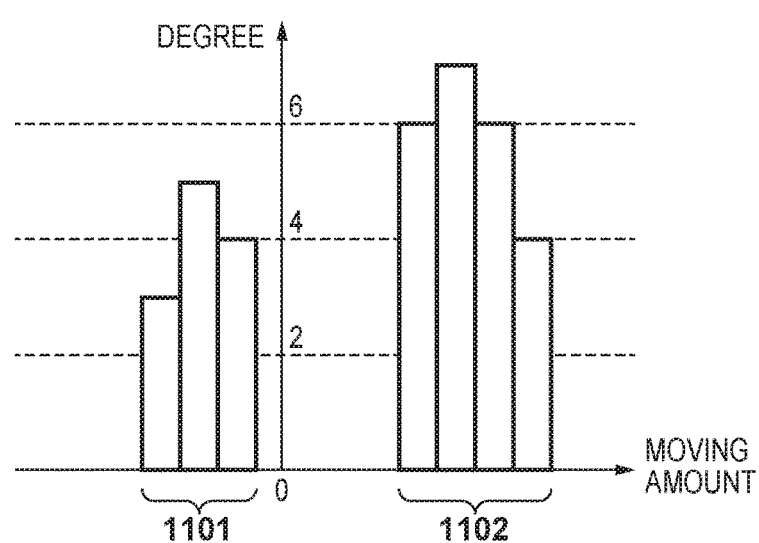
FIG. 9 is a diagram showing a histogram of moving amount.
Figure 10:
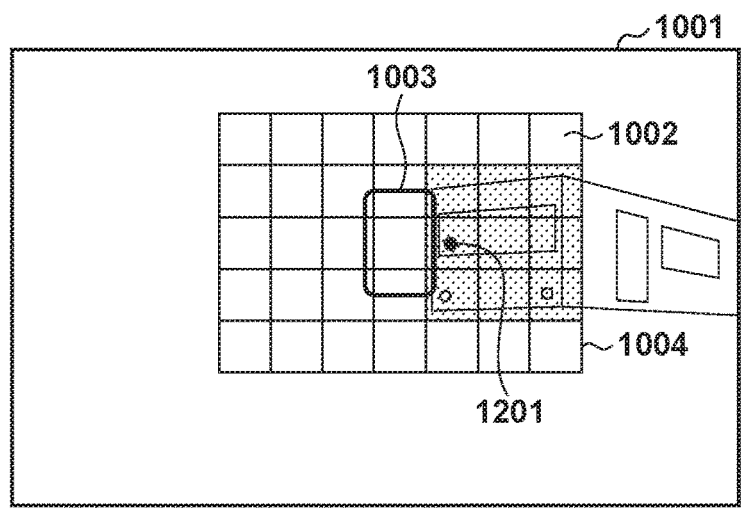
FIG. 10 is a diagram showing a main object area.

FIG. 9 is a diagram showing an example of a histogram, with the horizontal axis indicating moving amount and the vertical axis indicating degree. In S106, a main object area is determined from the histogram, and the procedure advances to S107. Here, the moving amounts shown in the histogram include two types of moving amounts, namely, the moving amount corresponding to the main object to be captured by the photographer and the moving amount corresponding to a blurred background. The present embodiment is intended to capture panning shots, and accordingly, among the detected moving amounts, data of a smaller moving amount serves as the moving amount of the main object, and the value of the moving amount serves as the amount of movement of the main object on the image plane. A set 1101 of moving amounts are closer to 0, and thus it is determined that the set 1101 of moving amounts correspond to the main object, and a set 1102 of moving amounts correspond to the background. The position of a moving amount acquiring frame 1002 that corresponds to the moving amount determined as the main object on the angle of view is determined as the main object area. FIG. 10 is a conceptual image showing a main object area, wherein a gray portion in the template frame 1004 is the main object area.

In S107, the placement coordinates of all of the moving amount acquiring frames 1002 (7×5 in the present embodiment) and the template frame 1004 as well as information regarding the main object area are transmitted to the object angular velocity calculation unit 134, and the procedure advances to S108. In S108, the center coordinates of a moving amount acquiring frame 1002 that is closest to the center coordinates of the image stabilization frame 1003 in the main object area is determined as a point of interest (determination of a point of interest), and the procedure advances to S109. FIG. 10 shows a point of interest 1201. If a point of interest has already been determined, basically, the procedure proceeds. However, if the point of interest is spaced apart from the center of the image stabilization frame 1003 by a threshold value or more, or if the moving amount cannot be calculated correctly and the point of interest cannot be found, the center coordinates of a moving amount acquiring frame 1002 that is closest to the center coordinates of the image stabilization frame 1003 is again set as the point of interest.

In S109, the placement of the next template frame 1004 is determined (determination of frame position) based on the point of interest, the moving amount of the moving amount acquiring frame (frame of interest) 1002 containing the point of interest and the position of the image stabilization frame 1003, and the procedure returns to S103. As the method for determining the placement, the placement is determined such that the center of a moving amount acquiring frame 1002 located at a position shifted from the point of interest by an amount corresponding to the moving amount of the frame of interest is the position to which the point of interest moved.

Figure 11A:
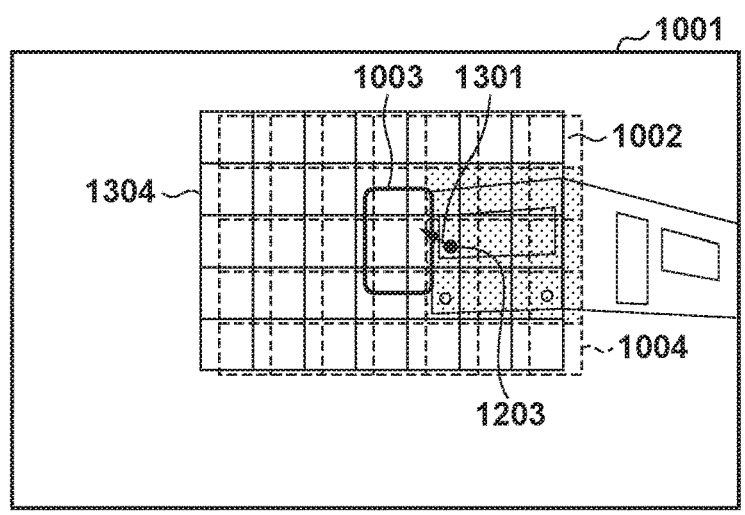
FIGS. 11A and 11B are diagrams showing how a template frame is arranged.
Figure 11B:
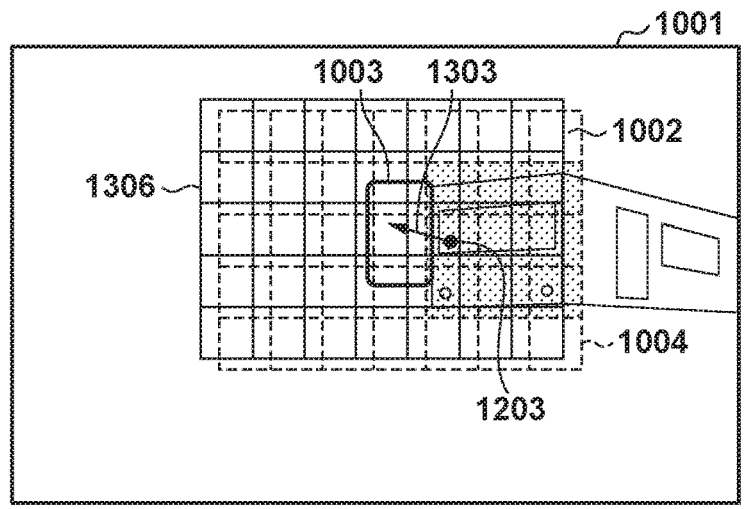

FIGS. 11A and 11B are diagrams showing examples of the position of the next template frame 1004. In FIG. 11A, the moving amount of the frame of interest is indicated by an arrow 1301, the position of the previous template frame 1004 is indicated by a broken line, and the position of a next template frame 1304 is indicated by a solid line. In FIG. 11B, the moving amount of the frame of interest is indicted by an arrow 1303, and the position of a next template frame 1306 is indicated by a solid line. In FIG. 11A, the destination of movement of the point of interest (tracked destination) is within the frame of interest, and thus in the placement of the next template frame 1304, the moving amount is detected in the moving amount acquiring frame located at a position in the fifth column from the upper left of the template frame 1304 toward the right and in the third row. On the other hand, in FIG. 11B, the destination of movement of the point of interest is outside the frame of interest, and thus in the placement of the next template frame 1306, the moving amount is detected in the moving amount acquiring frame located at a position in the fourth column from the upper left of the template frame 1306 toward the right and in the third row. By doing so, with respect to the object in the frame of interest, the moving amount can also be detected at the same object position in the next frame.

Here, if the frame placement of the template frame is not adjusted, the moving amount is detected at a position different from the position of the object, which causes an error in estimation of the object angular velocity during exposure. The adjustment of the frame placement is performed for each frame, but the template frame 1004 is fixed to the template frame determined in S102, and the moving amount is also used by integrating the moving amount for each frame. By doing so, the template frame is not significantly offset from the image stabilization frame 1003. This is because it is not possible to determine at which position on the object image stabilization should be stopped until the photographer performs a release operation, and it is therefore desired that the image stabilization frame 1003 is constantly located in the vicinity of the center of the template frame.

Figures 12, 13:
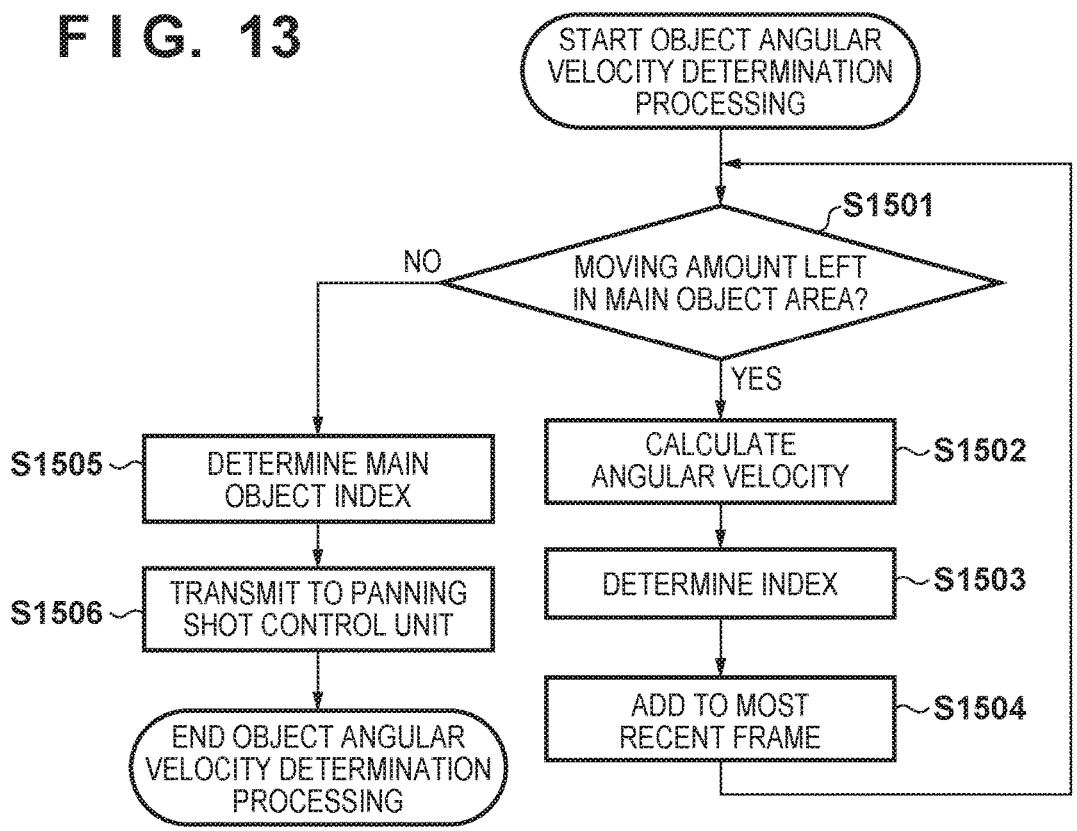
FIG. 12 is a diagram showing an example of angular velocity data for each object position according to the first embodiment.
FIG. 13 is a flowchart illustrating an object angular velocity determination operation.

The aforementioned step S107 will be described here in further detail. The object angular velocity calculation unit 134 that has received information in S107 determines an object angular velocity based on all of the moving amounts (7×5 in the present embodiment) acquired from the moving amount detection unit 135, the placement coordinates of the template frame 1004, the main object area information and the information accumulated for the past frames of the object angular velocity calculation unit 134 (see FIG. 12). In FIG. 12, as the information accumulated for the past frames, a maximum of 35 indices are held, each index including the angular velocity information of a maximum of five frames at the same object position and the coordinates in the angle of view in the most recent frame. The coordinates used here are based on a coordinate system in which the upper left of the angle of view is defined as the origin and the value increases as it moves to the lower right. Also, an index for which BLANK is shown in the COORDINATES column is an index that holds no information.

FIG. 13 is a flowchart illustrating an operation performed by the object angular velocity calculation unit 134. This processing starts upon acquisition of moving amounts from the moving amount detection unit 135. In S1501, if there are moving amounts in the main object area, one is selected from among 35 moving amounts acquired from the moving amount detection unit 135, and the procedure advances to S1502. If there is no moving amount of the main object area, the procedure advances to S1505. In S1501, the information of the selected and processed moving amount is held, and the processing from S1502 to S1504 is repeatedly performed until all of the moving amounts of the main object area are processed.

In S1502, the moving amount is converted to an angular velocity based on the focal distance information and the pixel pitch, and calculates object angular velocity information by taking into consideration the angular velocity acquired by the angular velocity sensor 107, and the procedure advances to S1503. In S1503, searching is performed for an index that matches the coordinate information corresponding to the moving amount. If an index that matches the coordinate information is found, the index is determined as a processing index. If an index that matches the coordinate information is not found, searching is performed for a blank index. If a blank index is found, the index is determined as the processing index. If a blank index is not found, information of an index corresponding to the farthest coordinates from the center of the image stabilization frame 1003 is deleted, and the index is determined as the processing index.

After the processing of S1503, the procedure advances to S1504. In S1504, the object angular velocity information of the oldest frame among the processing indices is rewritten by the information of the newest frame, the coordinate information is also changed to the coordinates of the destination of movement, and the procedure returns to S1501. The information accumulated as shown in FIG. 12 is generated by repetition of S1502, S1503 and S1509. In the present embodiment, the object angular velocity information is held as the accumulated information, but it is also possible to hold any information before the object angular velocity is calculated.

In S1505, among the indices, an index corresponding to the closest coordinates to the center of image stabilization frame 1003 is determined as a main object index, and the procedure advances to S1506. In S1506, an object angular velocity calculated for the main object index in a plurality of frames and the time an image was generated at the time of calculation are transmitted to the panning shot control unit 132, and the processing ends.

According to the present embodiment, the template frame is adjusted according to the motion of the object, and a candidate angular velocity for the object is held for each object position. By doing so, it is possible to calculate the object angular velocity with high accuracy and perform highly accurate image stabilization of panning shots.

Second Embodiment

Hereinafter, an image capturing apparatus according to a second embodiment of the present invention will be described. FIG. 14 is a diagram showing accumulated information generated by an object angular velocity calculation unit 134 according to the second embodiment. In the second embodiment, the operation of the object angular velocity calculation unit 134 is different from that of the first embodiment. In the first embodiment, in S1504, the angular velocity is held for each frame, and only the most recent coordinates are held, whereas in the second embodiment, both the angular velocity and the coordinates are held for each frame.

Figure 15:
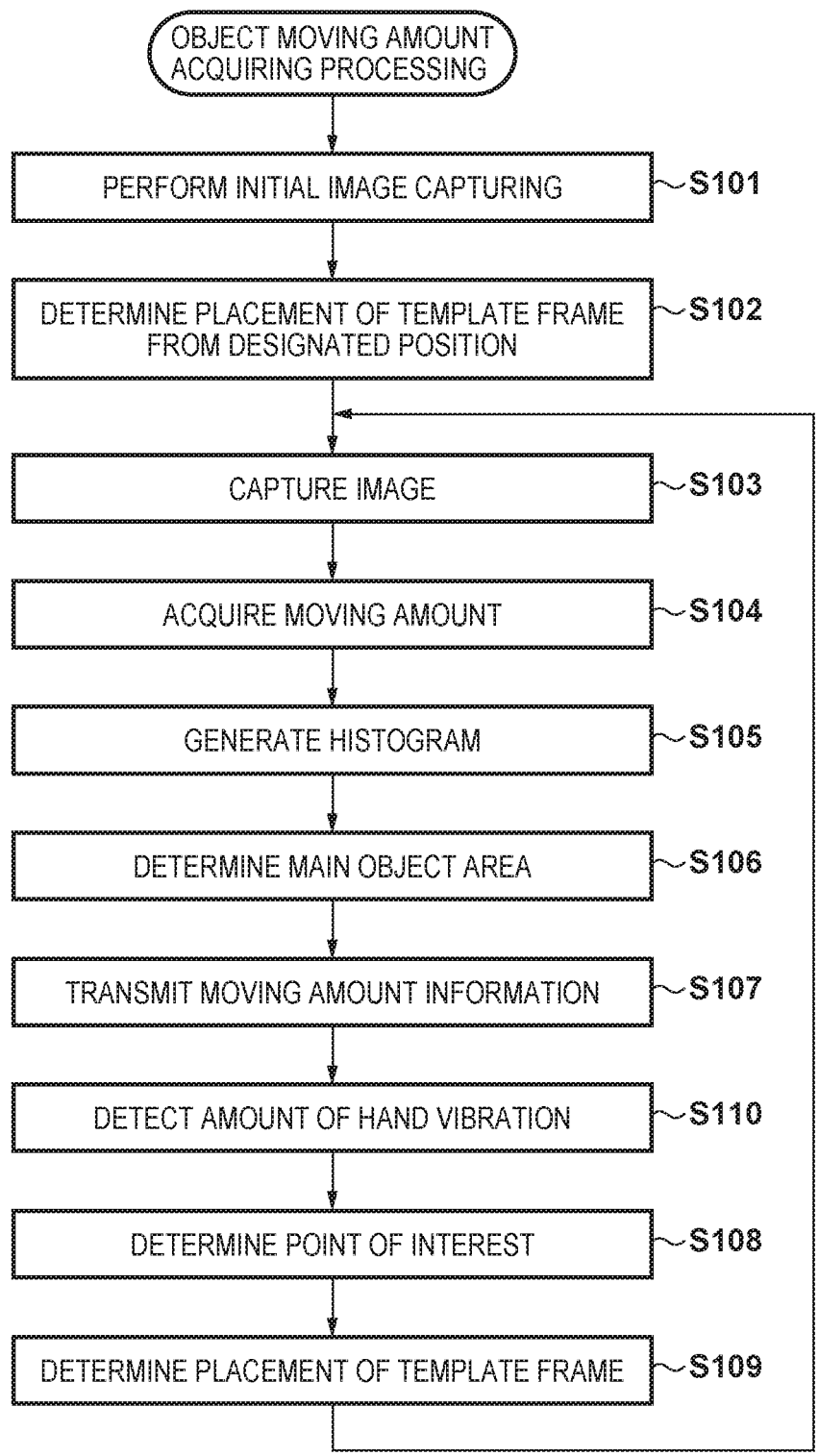
FIG. 15 is a flowchart illustrating an object moving amount acquiring operation according to the second embodiment.
Figure 16A:
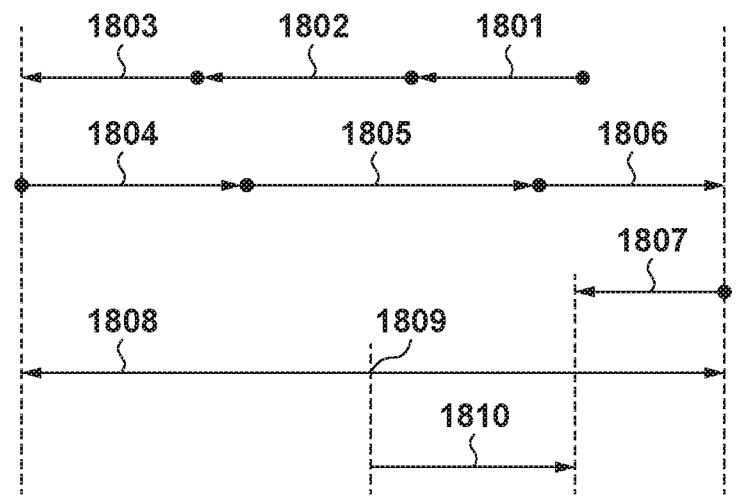
FIGS. 16A and 16B are diagrams illustrating the amount of hand vibration.
Figure 16B:
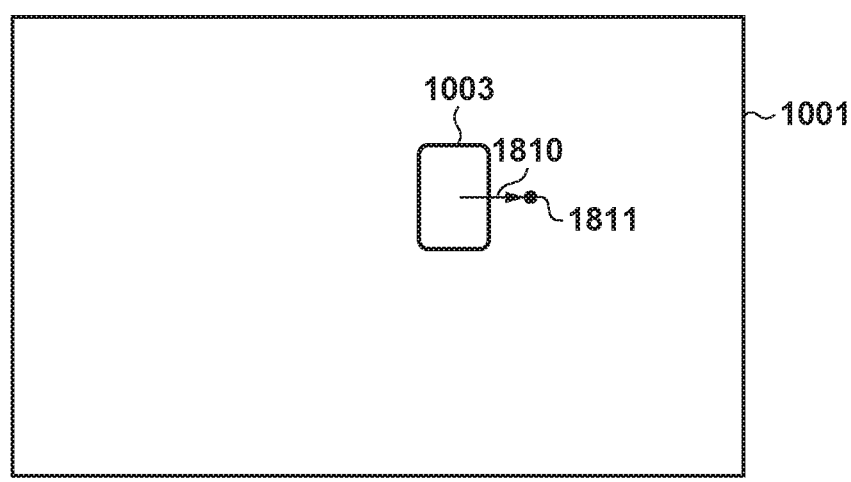
Figure 17:
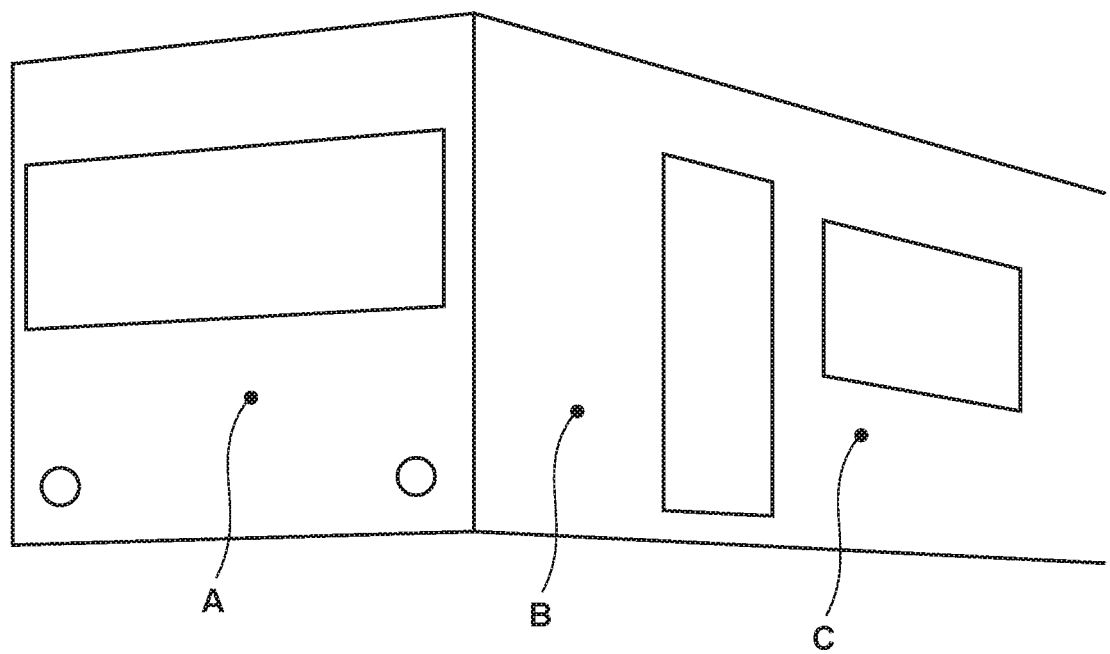
FIG. 17 is a diagram showing that angular velocity varies depending on the position on an object.
Figure 18:
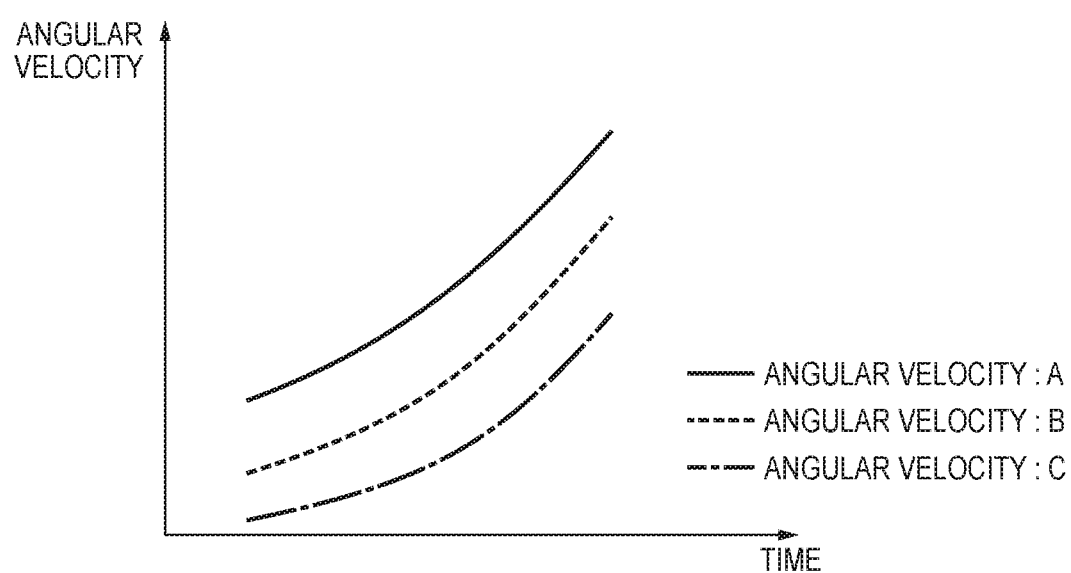
FIG. 18 is a diagram showing angular velocities obtained at different positions on a large object.

FIG. 15 is a flowchart illustrating an operation performed by a moving amount detection unit 135 according to the second embodiment. A difference from the operation of the first embodiment is that the processing of S110 is added between steps S107 and S108. After information has been transmitted to the object angular velocity calculation unit 134 in S107, in S110, with respect to the most recent frame, accumulated information processed by the object angular velocity calculation unit 134 is acquired, and the amount of hand vibration, which will be described later, is detected from the accumulated information. A method for detecting the amount of hand vibration of the image capturing apparatus will be described with reference to FIG. 16A. In FIG. 16A, tracks 1801 to 1807 of the point of interest are shown in chronological order. For the sake of facilitating the description, a description will be given only for the horizontal motion (the method is the same for the vertical motion). A horizontal turnaround distance (hand vibration width) 1808 indicates the distance moved by hand vibration. The center of the hand vibration width is indicated by 1809, and the amount of shift from the center of the hand vibration width to the most recent position (amount of vibration) is indicated by 1810. In FIGS. 16A and 16B, the point of interest reciprocates, but if the point of interest does not reciprocate, the amount of hand vibration cannot be detected. Also, if the amount of hand vibration is detected in S110, in S108 according to the second embodiment, a point shifted from the center coordinates of the image stabilization frame 1003 by an amount corresponding to the amount of hand vibration is updated as the point of interest. FIG. 16B shows a conceptual image. A point indicated by 1811 is determined as a new point of interest.

According to the present embodiment, when the photographer cannot correctly focus on the object due to hand vibration, the object angular velocity is calculated at the object position corrected for the amount of vibration caused by hand vibration, and thus favorable image stabilization of panning shots can be performed.

Although preferred embodiments of the present invention have been described above, the present invention is not limited to the embodiments given above, and various modifications and changes can be made within the scope of the present invention.

For example, the embodiments given above have been described by taking, as the configuration for correcting image blur, a configuration in which the capturing lens unit includes a shift lens that moves in a direction perpendicular to the optical axis. However, the present invention is not limited thereto, and it is possible to use an optical element that changes the optical path by moving in a direction different from the optical axis of the capturing lens such as tilting, or change the optical path by using a variable angle prism or the like. It is also possible to perform image stabilization by shifting the image sensor.

Also, in the embodiments given above, a configuration has been described in which a camera vibration is detected by the angular velocity sensor provided in the body of the camera, but the angular velocity sensor may be provided on the capturing lens side.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, as optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-221395, filed Nov. 11, 2015, which is hereby incorporated by reference herein in its entirety.

What is claimed is:

1. An image stabilization apparatus comprising:
at least one processor or circuit configured to perform the operations of the following units:
a first detection unit that detects object moving amounts at a plurality of positions on a screen by using two consecutive images captured by an image sensor;
a determination unit that determines an object range on the screen based on a result of detection performed by the first detection unit;
a point-of-interest determination unit that determines a point of interest based on a position on the screen designated by a user and the object range determined by the determination unit;
a frame position determination unit that determines a frame in which the object moving amounts are detected at the plurality of positions on the screen based on a moving amount of the point of interest on the screen;
a calculation unit that calculates a vibration width of the apparatus by using a track of the point of interest and calculates an amount of shift of the point of interest from a center of the vibration based on the vibration width and a timing of detecting the object moving amounts on the screen; and
a changing unit that changes the point of interest based on the amount of shift and the position on the screen designated by the user.

2. The image stabilization apparatus according to claim 1, wherein the determination unit determines a range having a small moving amount on the screen as the object range.

3. The image stabilization apparatus according to claim 2, wherein the determination unit determines, as the object range, an object range to be captured without a blur when capturing a panning shot.

4. The image stabilization apparatus according to claim 1, wherein the at least one processor or circuit is further configured to perform the operations of the following units:
a holding unit that holds object position information regarding an object position within the object range in association with moving amount information at the object position based on the result of detection performed by the first detection unit and a result of detection performed by a second detection unit that detects a motion of the apparatus; and
a control unit that controls an operation of an image stabilization unit that corrects object image blur so as to correct an object image blur at the object position based on the object position information and the moving amount information at the object position held in the holding unit.

5. The image stabilization apparatus according to claim 4, wherein the changing unit further changes the point of interest if a difference between a position of the point of interest after the point of interest is tracked based on the moving amount of the point of interest and the position on the screen designated by the user is greater than a threshold value.

6. The image stabilization apparatus according to claim 4, wherein the second detection unit detects an angular velocity of the apparatus.

7. The image stabilization apparatus according to claim 4, wherein the image stabilization unit changes an optical path of light from an object by moving in a direction different from an optical axis of an image capturing optical system.

8. The image stabilization apparatus according to claim 7, wherein the image stabilization unit is a lens that changes the optical path of light from the object by moving in the direction different from an optical axis of the image capturing optical system.

9. A method for controlling an image stabilization apparatus, the method comprising:
detecting object moving amounts at a plurality of positions on a screen by using two consecutive images captured by an image sensor;
determining an object range on the screen based on a result of detection performed in the detecting;
determining a point of interest based on a position on the screen designated by a user and the determined object range;
determining a frame in which the object moving amounts are detected at the plurality of positions on the screen based on a moving amount of the point of interest on the screen;
calculating a vibration width of the apparatus by using a track of the point of interest and calculating an amount of shift of the point of interest from a center of the vibration based on the vibration width and a timing of detecting the object moving amounts on the screen; and
changing the point of interest based on the amount of shift and the position on the screen designated by the user.

10. A non-transitory computer-readable storage medium storing a program for causing a computer to execute the steps of a method for controlling an image stabilization apparatus, the control method comprising:
detecting object moving amounts at a plurality of positions on a screen by using two consecutive images captured by an image sensor;
determining an object range on the screen based on a result of detection performed in the detecting;
determining a point of interest based on a position on the screen designated by a user and the determined object range;
determining a frame in which the object moving amounts are detected at the plurality of positions on the screen based on a moving amount of the point of interest on the screen;
calculating a vibration width of the apparatus by using a track of the point of interest and calculating an amount of shift of the point of interest from a center of the vibration based on the vibration width and a timing of detecting the object moving amounts on the screen; and changing the point of interest based on the amount of shift and the position on the screen designated by the user.

\* \* \* \* \*